United States Patent [19]
Lotz et al.

[11] Patent Number: 5,286,005
[45] Date of Patent: Feb. 15, 1994

[54] LONG LIFE AND MULTIPURPOSE HIGH PERFORMANCE BURNER

[75] Inventors: Horst K. Lotz, Hofheim-Wallau; Mattias Lotz, Weisbaden-Delkenheim, both of Fed. Rep. of Germany

[73] Assignee: GeGa Corporation, Pittsburgh, Pa.

[21] Appl. No.: 822,942

[22] Filed: Jan. 21, 1992

[51] Int. Cl.⁵ ............................................. B23K 7/10
[52] U.S. Cl. ................................... 266/77; 266/48; 239/394
[58] Field of Search .......................... 266/48, 76, 77; 148/205; 239/390, 393, 394, 397

[56] References Cited

U.S. PATENT DOCUMENTS

| | | | |
|---|---|---|---|
| 773,203 | 10/1904 | Fosdick | 239/394 |
| 1,639,328 | 8/1927 | Coberly | 239/394 |
| 1,670,495 | 5/1928 | Coberly | 239/394 |
| 3,516,611 | 6/1970 | Piggott | 239/394 |
| 4,439,249 | 3/1984 | Singh et al. | 266/48 |

FOREIGN PATENT DOCUMENTS 87904525 12/1985 European Pat. Off. .
WO8800317 1/1988 PCT Int'l Appl. .

*Primary Examiner*—Scott Kastler
*Attorney, Agent, or Firm*—Walter J. Blenko, Jr.; George K. Stacey

[57] ABSTRACT

By means of an extended nozzle head having several excentrical nozzle receptions although the cutting oxygen is in line with the cutting jet bores, rotation of the nozzle head or of the total lower part of the burner can bring the working cutting nozzle into correspondence with a determined cutting line; being manifold equipped the thickness of a sample slice can be between two cutting nozzles selected by rotation or a spare nozzle can be put into operation quickly in case of breakdown. The nozzles for sample cutting or replacement are covered behind a protection plate against splash and flames. The protection plate can serve as well as a guide for a save pilot flame. The flexible connection of the adjustable burner and its gas supply is performed by metallic piping accordingly shaped and dimensioned.

14 Claims, 15 Drawing Sheets

LONG LIFE AND MULTIPURPOSE HIGH PERFORMANCE BURNER

BACKGROUND OF THE INVENTION

To heat, weld, oxy-cut and scarf in steelworks, ship yards, steel construction and machine building factories, burners are used which consist of a shaft tube and centrally inserted scarfing, heating or cutting nozzle. The burner head carrying the nozzle is supplied with heating gas, heating oxygen, possibly air and cutting oxygen by pipes going through an uncooled or cooled shaft tube. From there these gases flow into the screwed-in or clamped-in nozzle, to be brought into the proper mixture and exit velocity and to burn after the exit with the wanted heating efficiency or to exit as a well-formed cutting jet to separate work pieces of steel by burning with a suitable advance. This applies as well for heating and welding burners without a cutting oxygen jet, or with a softer and larger volume scarfing jet instead a cutting jet for scarfing burners to machine off steel surfaces with oxygen and gas.

When cutting thicker and warmer work pieces of steel, i.e. when separating billets, blooms and slabs in steel mills, especially for separation of hot continuously moving steel strands produces in continuous casting, requirements come up, which can only be answered with difficulties and incompletely by applying several or replacing commonly used burners in an operation interrupting manner.

Part of them is the occasionally added separation of test slices for quality control of the cast material. To improve the cutting efficiency, to avoid deformations or metallurgical changes sometimes additional heat is applied to the material to be cut by additional burners respectively nozzles.

During long lasting processes such as cutting or scarfing the cutting, scarfing and also the heating nozzles have to be replaced in rather short intervals because of wear and pollution by flying cutting slag and sparks.

In all three aforementioned cases, the main burner respectively main burners resp. their nozzles have to be replaced or exchanged, which is costly and difficult.

SUMMARY OF THE INVENTION

The invention described in the following claims to give in total an economic, safe and as well otherwise advantageous answer to the request for better equipment asked for all three cases and maybe other similar ones.

Basically the corresponding burner for this will be produced with a much bigger diameter and the replacement or exchange nozzles will be arranged eccentrically in the same nozzle head, in order to heat either in front of or behind but on any rate as well besides the main cutting nozzle to bring into operation another until now protected nozzle instead of a meanwhile insufficiently working nozzle by rotating or shifting the burner or only the nozzle head to bring two nozzles located one behind or besides the other into a related even asymmetrical position to each other with a distance corresponding to the sample slice thickness by rotating or shifting the burner for cutting samples. Otherwise the sample cutting nozzle remains behind a protection plate like the other spare nozzles or unused heating nozzles.

A further advantage of this invention is the easy adjustment and re-adjustment of two nozzles cutting against each other in one line to have a most exact and smooth meeting of the two cuts. The adjustment of the burner can be performed by hand in a lowcost manner for simple installation, i.e., by turning with a suitable cup type spanner to avoid a bending momentum or by a remote controlled servo drive, if the gas-, oxygen- and water supply resp. water discharge is designed accordingly as well using rotating fluid connections or flexible hose or pipe supply lines.

The protection plate may be stationary or rotatable depending on design and cover smaller or bigger circle sections. It as well can serve at the same time as guide plate if a nozzle now not cutting adjacent to the cutting nozzle shut on and off again just does serve as a continuously burning pilot flame with reduced consumption or if a hollow shaft pipe penetrating burner and nozzle head with suitable exit bore is used to be an ignition flame burner.

BRIEF DESCRIPTION OF THE DRAWINGS

The FIGS. 1 to 19 show designs corresponding to this invention.

DETAILED DESCRIPTION OF THE PREFERRED EMBODIMENT

Figure 1:
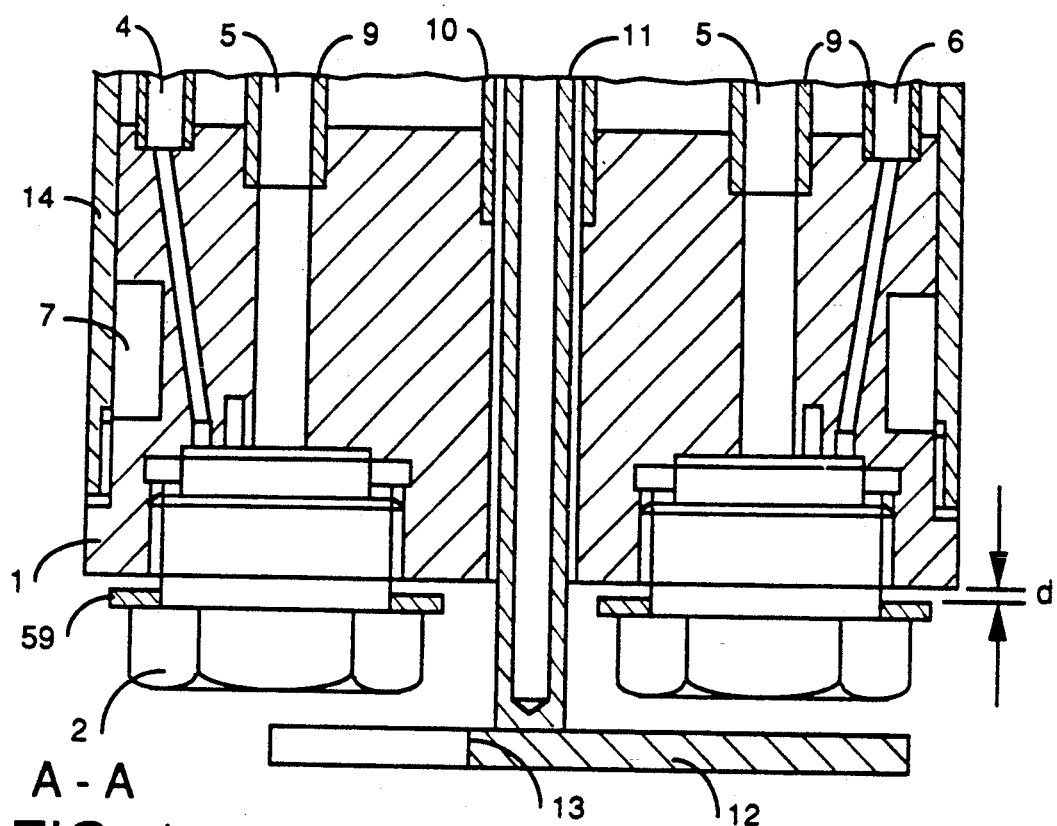
Figure 2:
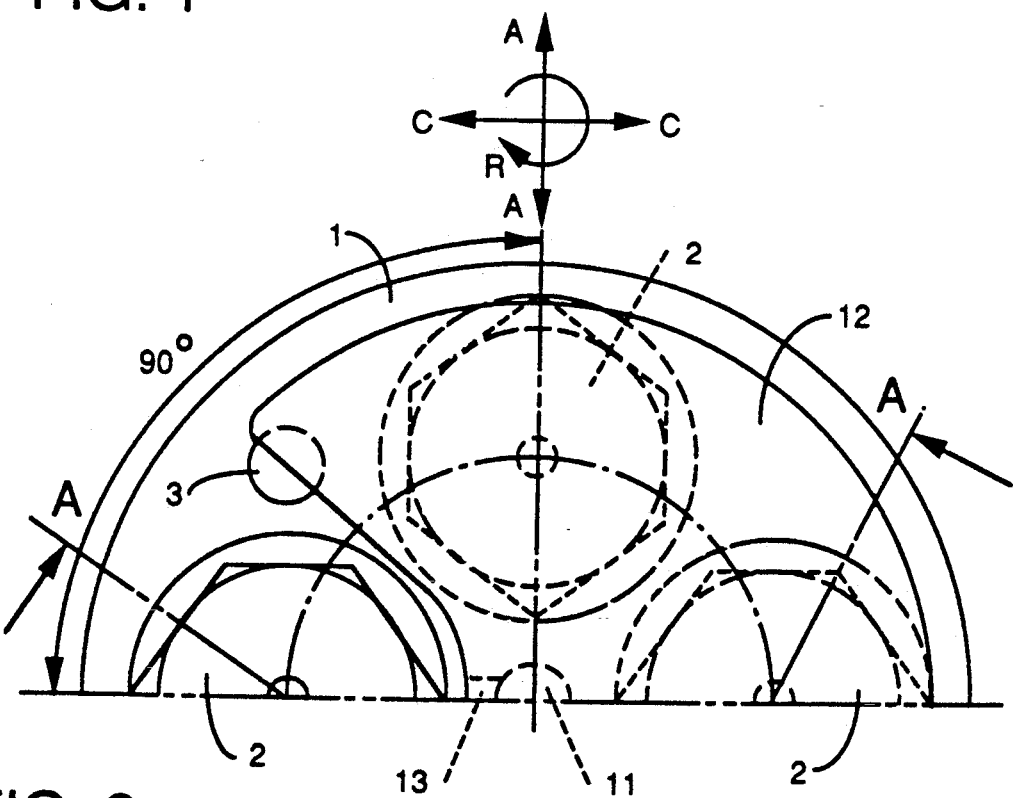

FIG. 1 shows the section A—A of a nozzle head with cutting nozzle 2 and shaft tube 14 and FIG. 2 a view from below.

Here is 1 the nozzle head with the eccentrically arranged cutting nozzles 2, which is supplied with the media using commonly known supply pipes 9, supply bores and circular channels for heating oxygen 4, cutting oxygen 5 and heating gas 6. A water circulation is possible by an outside circular channel 7 covered by the shaft tube 14. The center of the nozzle head 1 connected with a hollow axle 10 is bored to be penetrated by a hollow shaft 11 to which the protection plate 12 with a guide groove 13 covering the not operating cutting nozzles 2 (or heating nozzles) is fixed. FIG. 2 shows for example the arrangement of 4 cutting nozzles 2 of which 3 are covered by the protection plate 12 from below and it shows the bores 3, symmetrically arranged to allow the burner being rotated without being bent.

Figure 3:
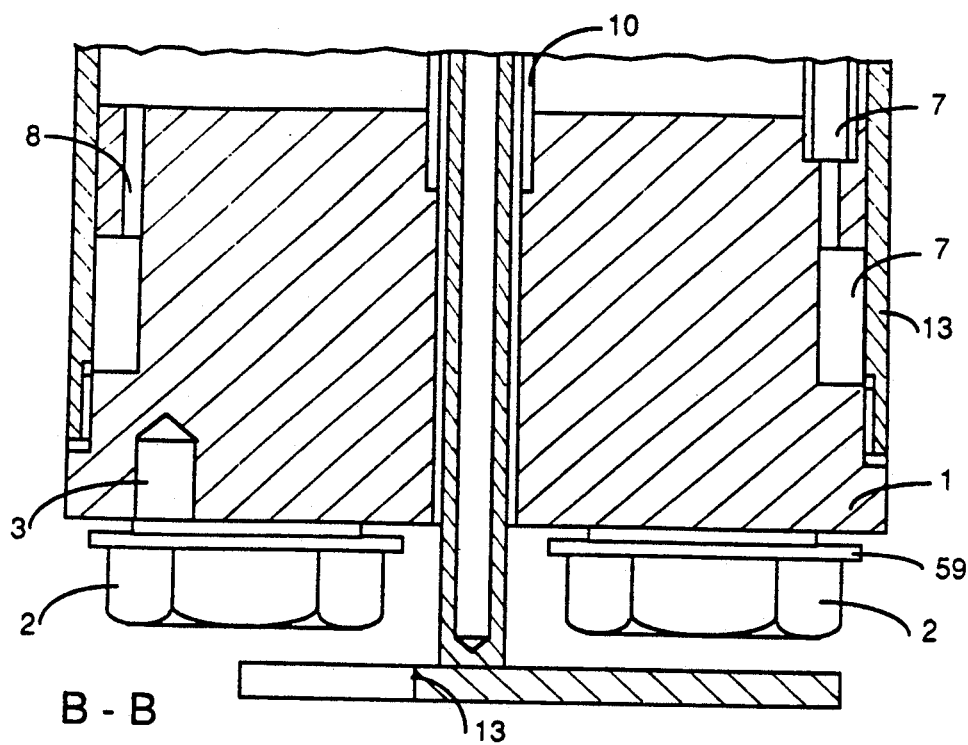

FIG. 3 also shows a section B—B of a nozzle head 1 with the attached parts like nozzle 2, shaft tube 14, cooling water inlet and circulation channels 7 and discharges 8 into the shaft tube 14 and indications of other parts and forms already known from FIG. 1.

Figure 4:
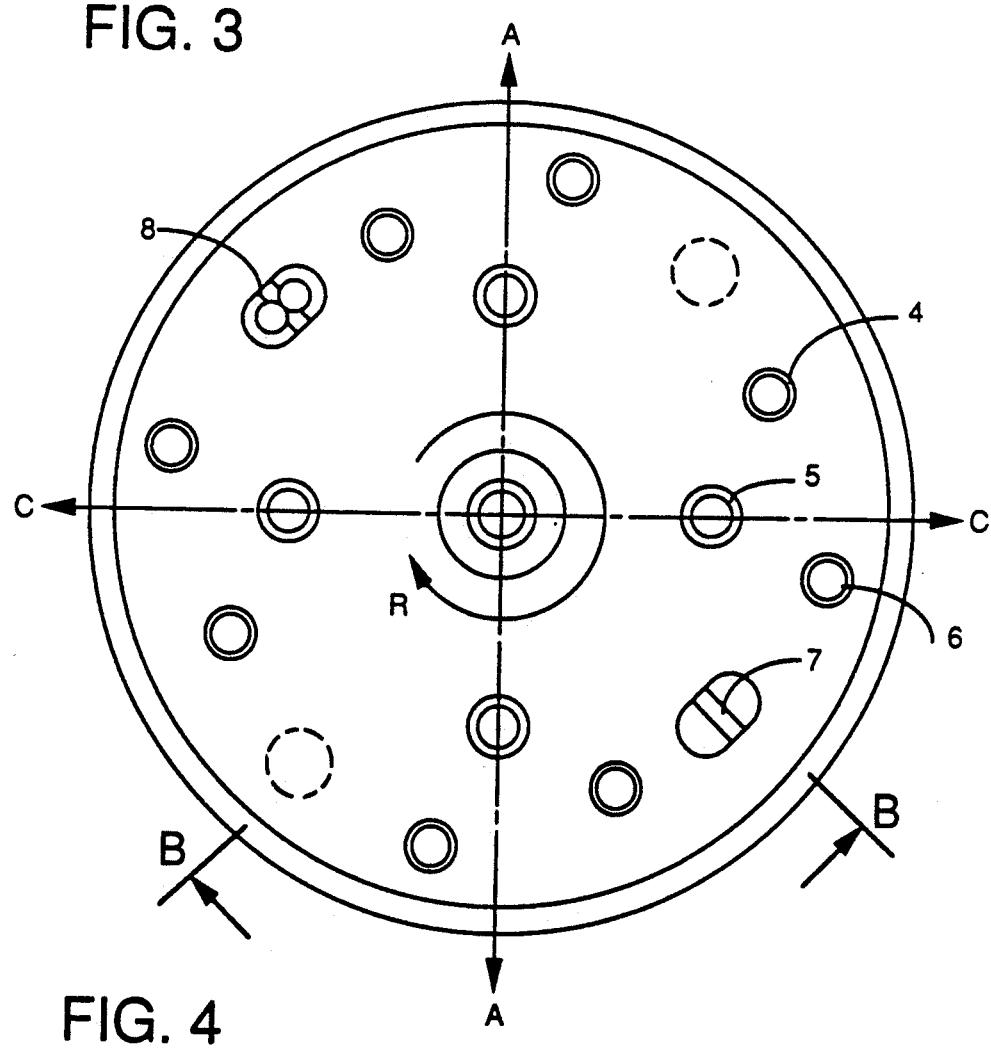

The top view of the nozzle head FIG. 4 shows the arrangement of the various supply pipes resp. bores for heating oxygen 4, cutting oxygen 5, heating gas 6, cooling water inlet 7 and cooling water discharge 8 into the shaft tube 14. The hollow axle 10 and the hollow shaft 11 lie in the center.

Figure 5:
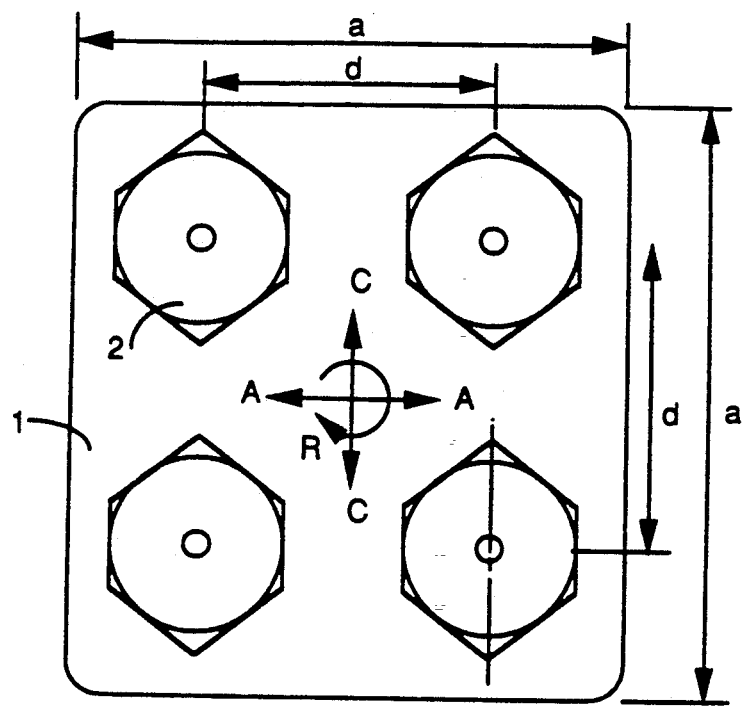

FIG. 5 shows from below completing FIG. 4 the invention corresponding arrangement of cutting nozzles 2 forming a square with the smallest distances 'd' necessary to insert or to unscrew the nozzles which results in the smallest size of the nozzle head 1 with a×a. The relative shaft tube can as well be squared or round.

Figure 6:
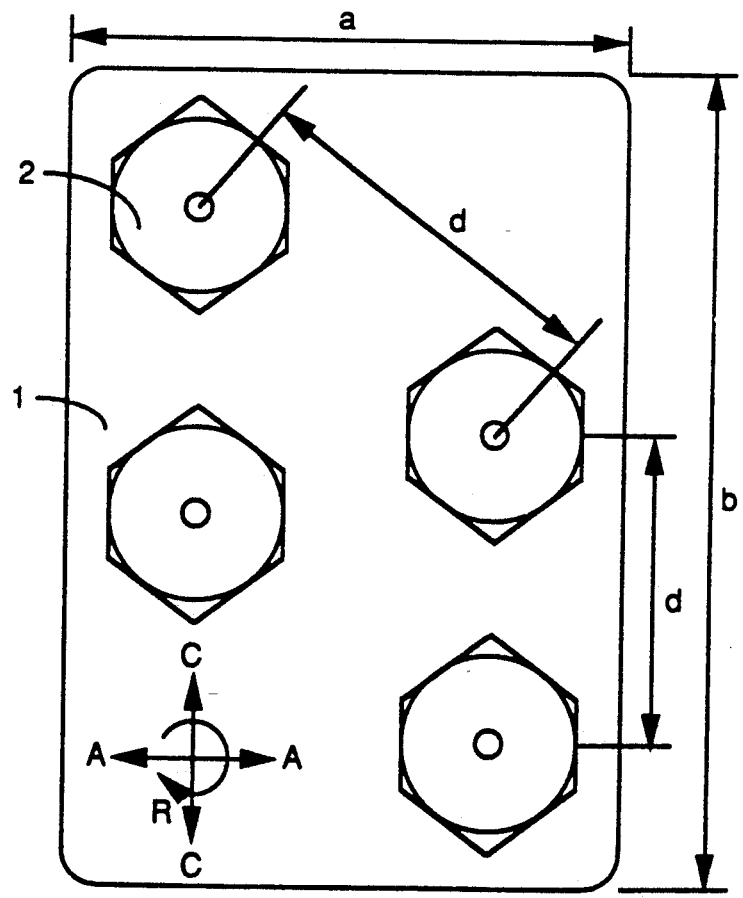

The corresponding FIG. 6 shows a rectangular arrangement of the cutting nozzles 2 in the rectangular nozzle head 1 having the distances 'd' which results in the nozzle head size a×b. Other arrangements are possible as well. In all cases one relates to cutting direction 'C', adjustment direction 'A' and rotating direction 'R', which are indicated with big arrows 'C' for the cutting and small arrows for adjustment and rotation. Depending on machine design the cutting and rotating plane can be exchanged.

Figure 7:
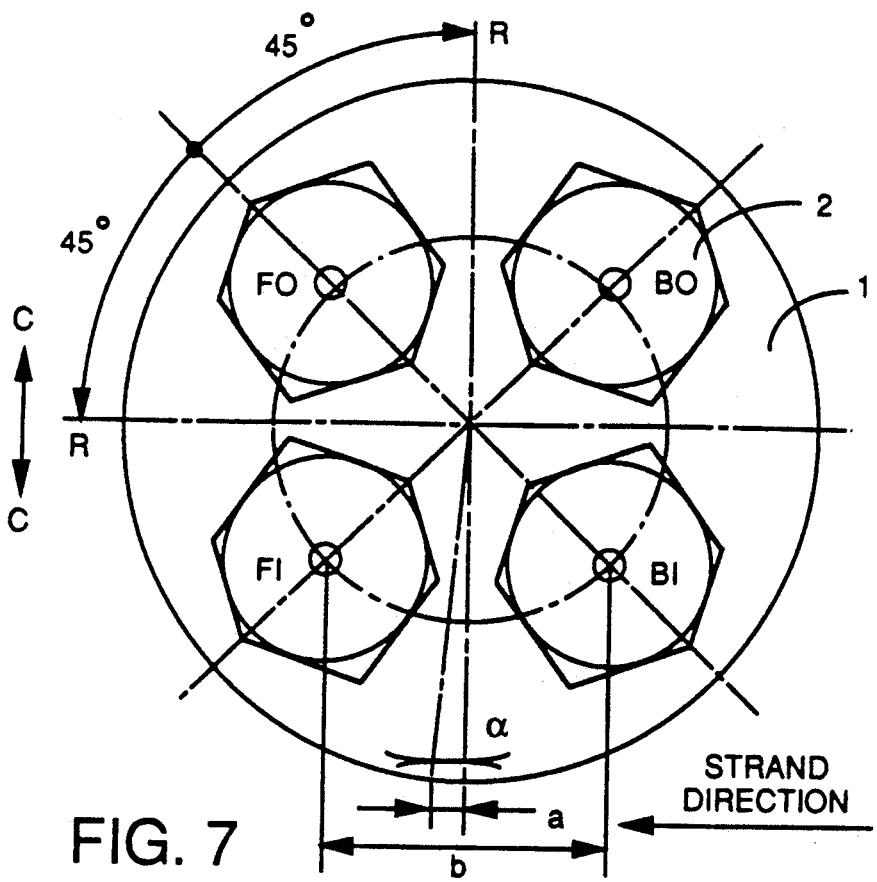

In FIG. 7 a cutting nozzle 2 arrangement in square is shown, in which by rotation of the burner head for a little measure 'a' or a little angle α the position of the cutting plane (=direction) to the strand direction i.e. for the exact simultaneous cutting of two burners against each other in one plane =cutting line can be exactly adjusted resp readjusted.

As well in FIG. 7 the square arrangement of 4 cutting nozzles 2 in a round nozzle head is shown, which can be rotated by 45° in relation to the work piece position i.e. strand casting direction corresponding as well to the adjustment direction. Thus the cutting nozzle 2 can go from position FO into the position BO or FI, others correspond.

In this the nozzle positions are defined in relation to the strand and to the machine and to the cutting direction (=towards the in-side):

FO Front Outisde
FI Front Inside
BO Back Outside
BI Back Inside

Normally one uses the cutting nozzle 2 in FI position of one burner to cut against the cutting nozzle 2 in FI position of the opposite burner in mirror like arrangement. For sample cutting for instance one uses the cutting nozzle 2 in BO position together with the cutting nozzles 2 in FI position, as the sample cut must be finished later (second) above a collecting container. But a combination of the FI and the B1 cutting nozzle 2 positions is as well possible. A slight rotation with the measure a or the angle α is used as described before and as well to adjust a common cutting line with a burner cutting from the opposite side.

All other cutting nozzles 2 can be used as spare cutting nozzles or heating nozzles or for other cutting work i.e. for bigger cutting thicknesses.

Figure 8:
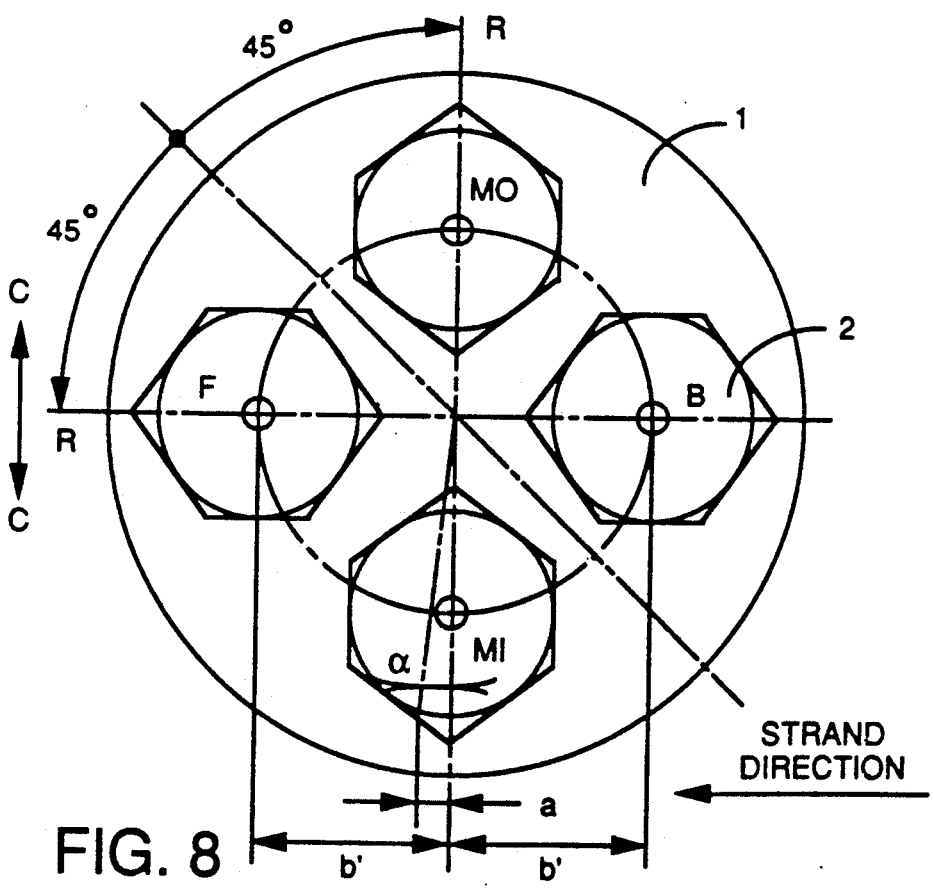

The FIG. 8 shows a nozzle arrangement of cutting nozzles 2 in nozzle head 1 like shown in FIG. 7 but only rotated by 45° into a diamond base position with a ±45° rotability.

Here again the nozzle position MI=Middle Inside can be looked at to be the normal cutting nozzle 2 with the cutting nozzle 2 in 'B'=Back position for sampling, or the same applies for the nozzle positions 'F'=Front and 'MO'=Middle Outside. Because of the basic arrangement there are as well other combination possibilities until the squared arrangement as in FIG. 7 is reached. As well the 'MI'=Middle Inside position could be used for the main cutting burner nozzle 2, the cutting nozzle 2 in MO=Middle Outside position for spare and the others in positions F and H as additional heating nozzles.

Figure 9:
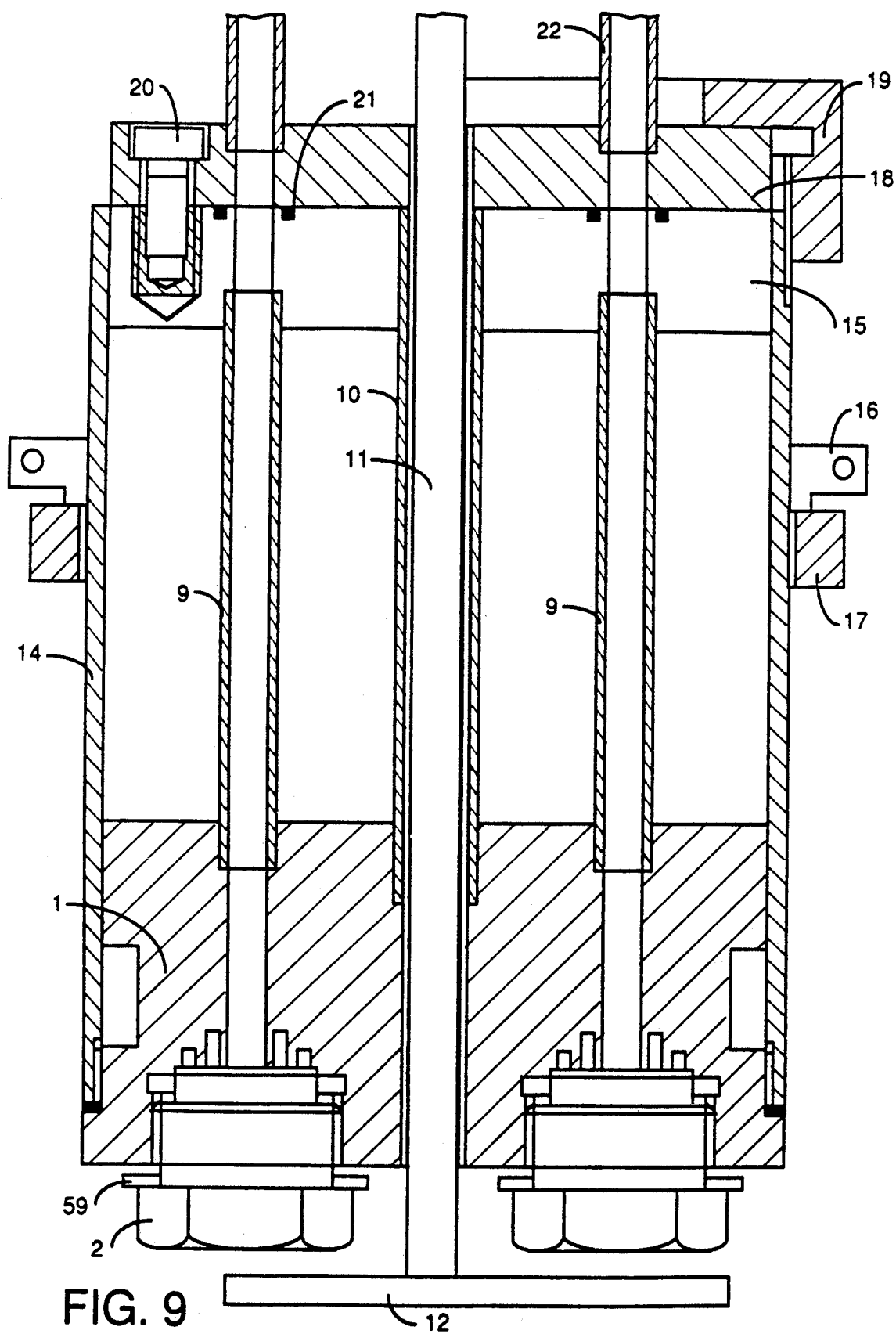

FIG. 9 shows a simple but complete burner for 4 nozzles, partly as a section view. Apart from the already known details, the through going supply pipes, hollow axle 10 and hollow shaft 11 in the shaft tube 14 are shown and how they arrive in the connection plate, of which the bores and circular channels are sealed-off against the environment by means of O-rings 21, when the cover plate 18 is screwed on to the shaft tube 14 by the cover nut 19. The from here protruding supply pipes 22 are connected by piping or flexible hoses with a gas control system for switching on or to shut off 1,2 or more nozzles depending on the relevant operation process. This type of connection can speed up the burner exchange very much, otherwise a minimum of 14 unions have to be loosened and then screwed on again for 4 nozzles. Instead of one big cover nut 19, the cover plate 18 can also be fixed with several cover screws 20. The shaft tube 14 has a positioning ring 16 in suitable height for the burner to sit on if it is stuck into a holding support 17.

Figure 10:
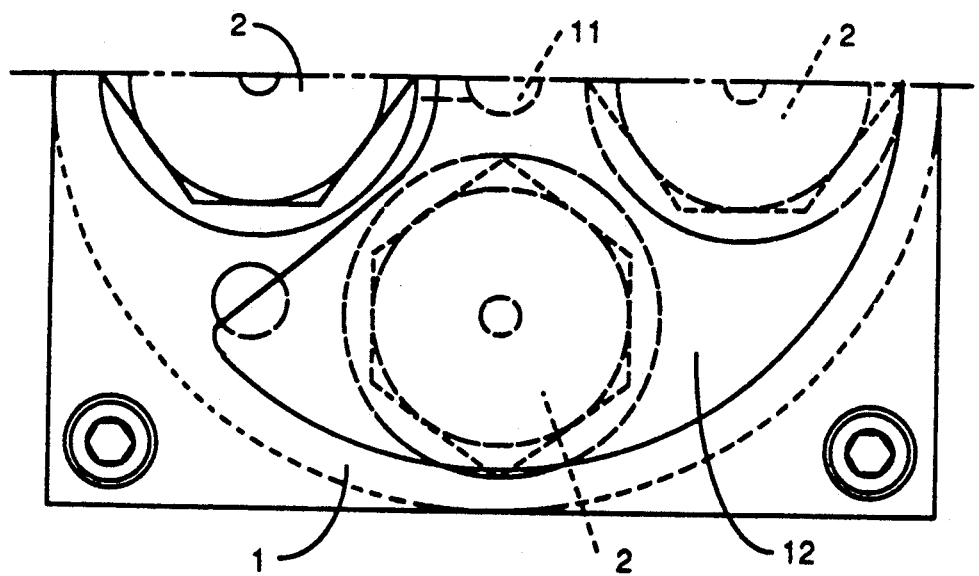
Figure 10:
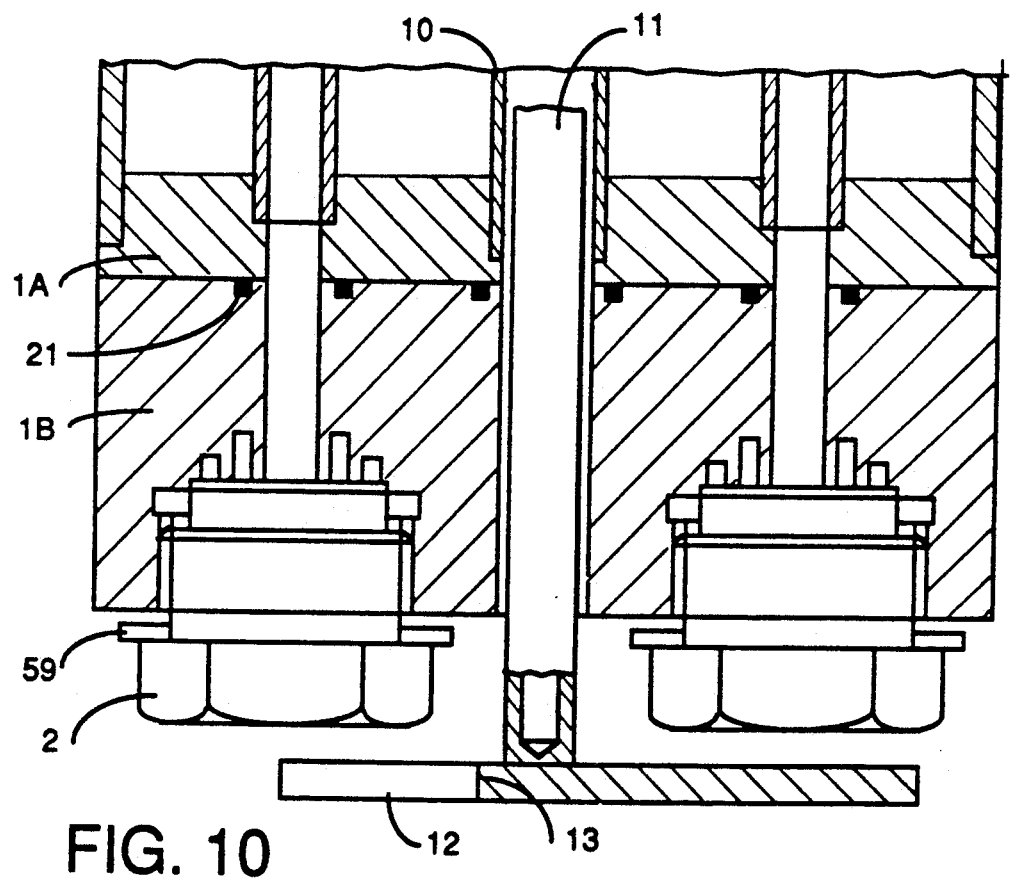

Another advantageous design of a burner is shown in FIG. 10, corresponding to the claims of the invention.

Instead having a one basic part body to be the burner or to allow the connection with a protection by a shaft tube 14 given in FIG. 9, the nozzle head 1 is split up like in FIG. 10 into a nozzle head flange 1a and a nozzle head body 1b and screwed together with laid in between O-rings 21. Otherwise the details given in FIG. 9 apply, but now an exchange of the round or rectangular nozzle head body is possible with advantages in respect to weight, time and cost For exchange now the heavy total burner need not to be taken from its support.

Figure 11:
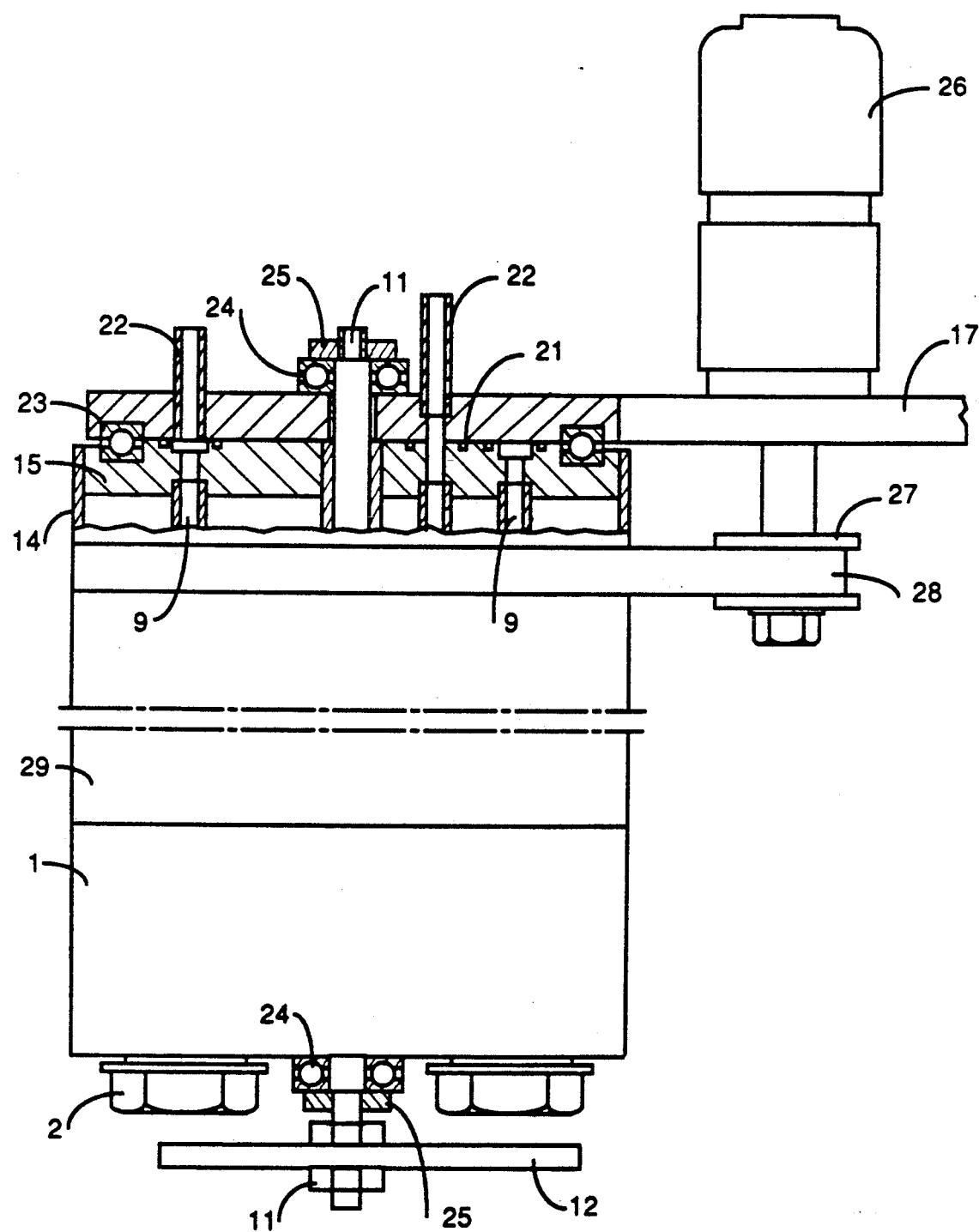

Corresponding to FIG. 11 the supporting of the burner as per the invention including burner head 1, cutting nozzle 2, supply pipes 9, shaft tube 14, connection plate 15, O-rings 21 etc. is planned thus that between the latter and the support plate 17 is a rotation bearing 23 is arranged and the burner totally hangs via the upper shaft bearing 24 and the shaft nut 25 on the hollow shaft 11 using the shaft bearing 24 and the shaft nut 25 as supporting parts. A motor 26 with a pinion 27 as well installed on the support plate 17 can actuate corresponding rotations using a drive band 28 going around the burner body 29.

Figure 12:
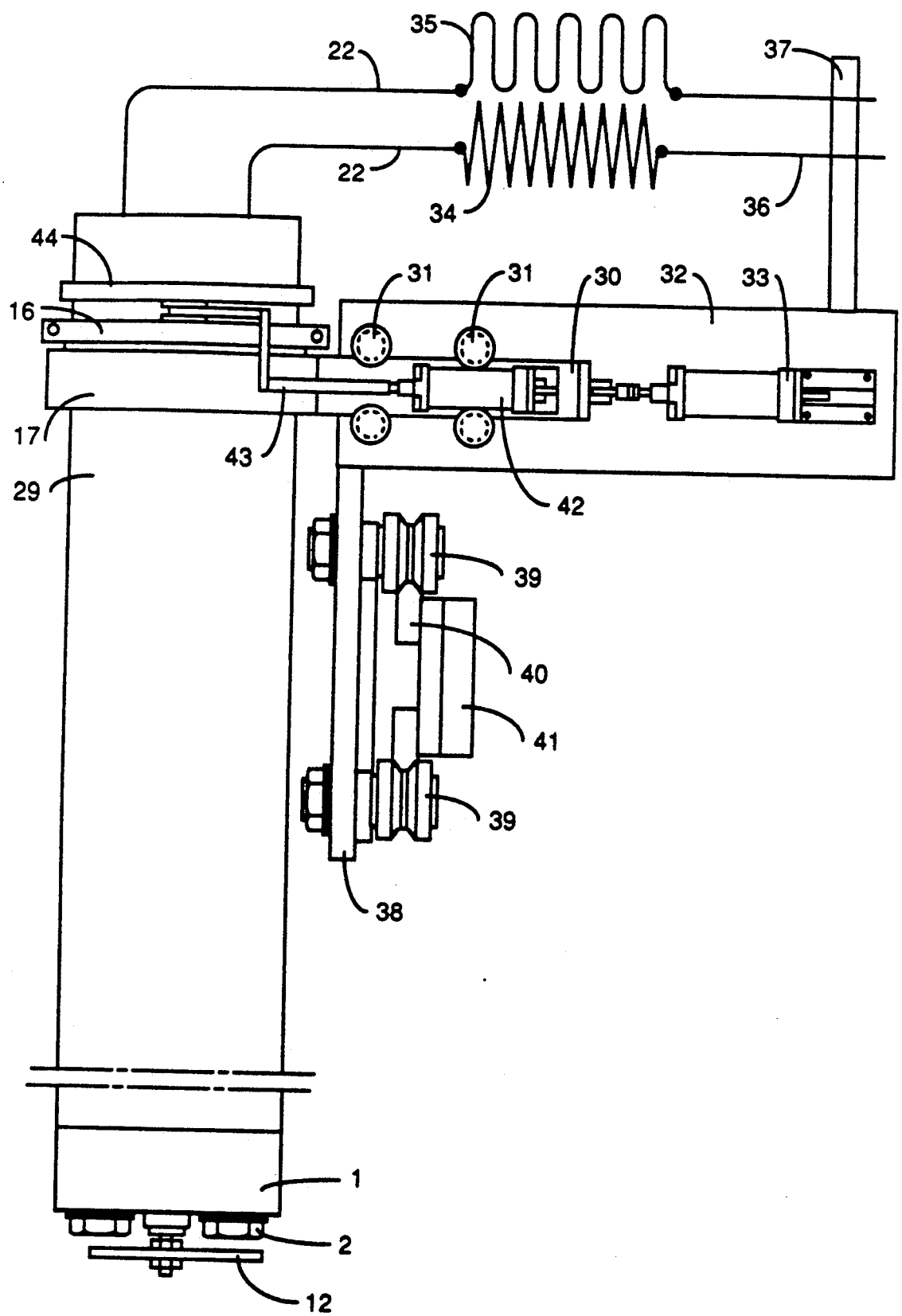

In FIG. 12 another invention corresponding design of the adjustment drive for the respective use of the different cutting nozzles 2 is shown. Here the simple straight line adjustment of the burner body 29 forward and backward is combined with a rotation drive. A holding arm 30 carries the already known support plate 17 with the position ring 16 above and is guided by adjusting rollers 31 on an adjustment plate 32 and shifted forward and backward by an adjustment drive 33 for instance a cylinder/piston system. An adjustment is facilitated by a flexible adjustable pipe spiral 34 or corresponding flexible hoses 35, which unites the supply pipes 22 and the fixed piping 36 held by a pipe holder 37. The adjustment plate 32 is fixed to the burner carriage 38 travelling forward and backward with cutting speed on travelling rails 40 screwed to the track 41 using travelling rollers 39. So far the linear adjustment possibility is described. To rotate the burner body 29, a rotating cylinder 42 having a rotating piston 43 is mounted on to the holding arm 30. The rotating piston 43 is connected with a joint to a rotating lever 44 of the burner body 29 and now can as well rotate the burner for adjustment or nozzle exchange in addition to the shifting adjustment.

Figure 13:
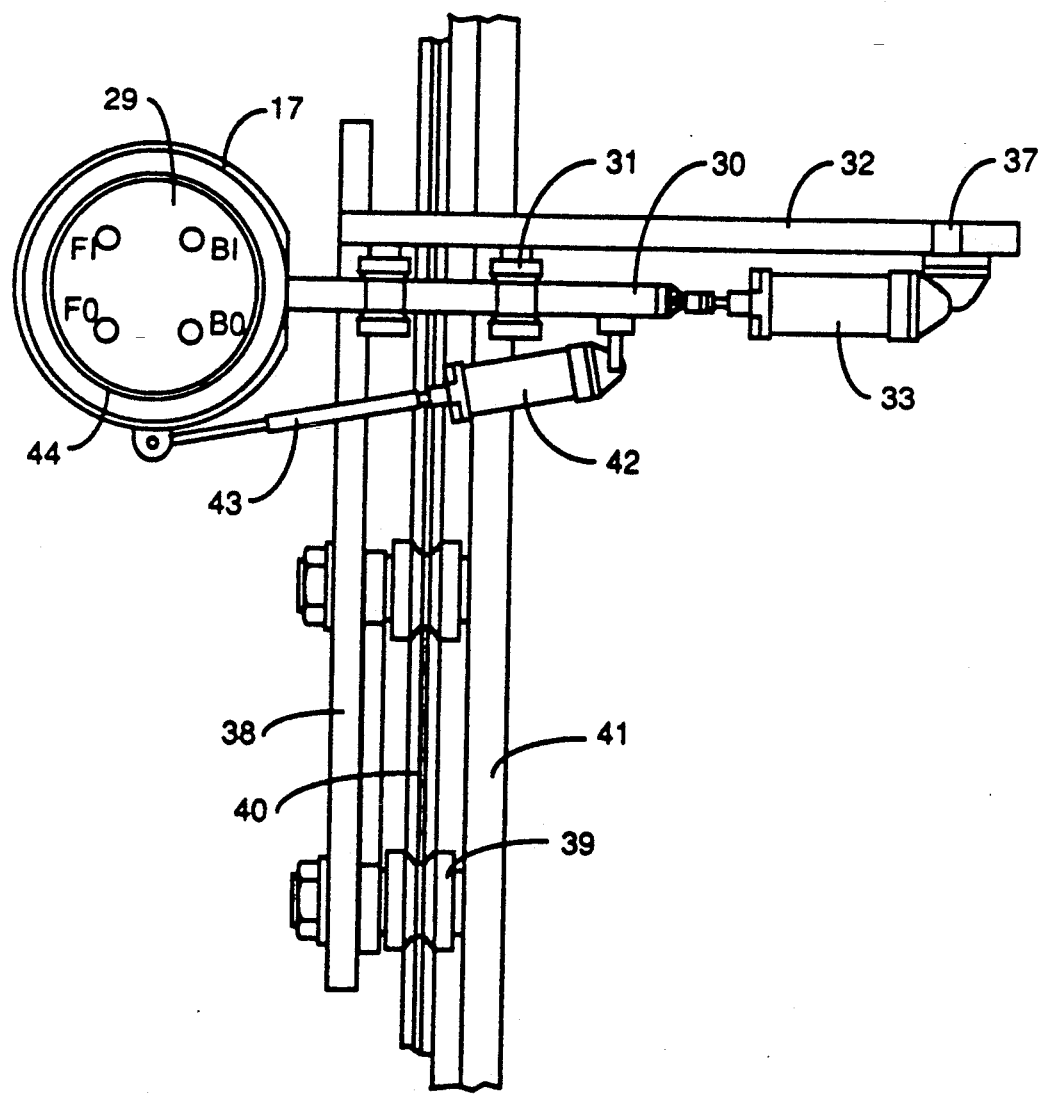

In FIG. 13 the adjustment and rotating system described in FIG. 17 is given again in a top view for better understanding.

Figure 14A:
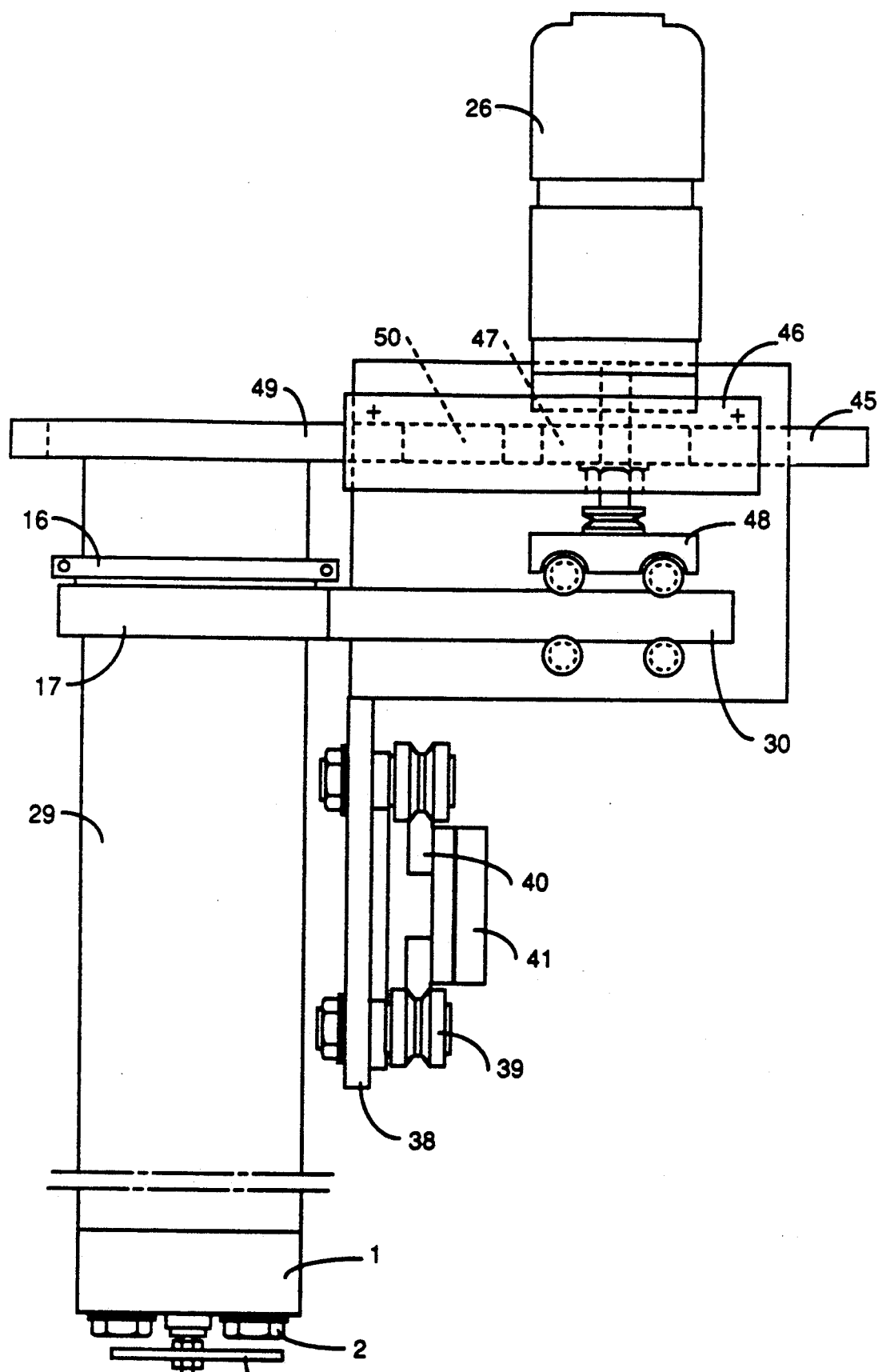
Figure 14B:
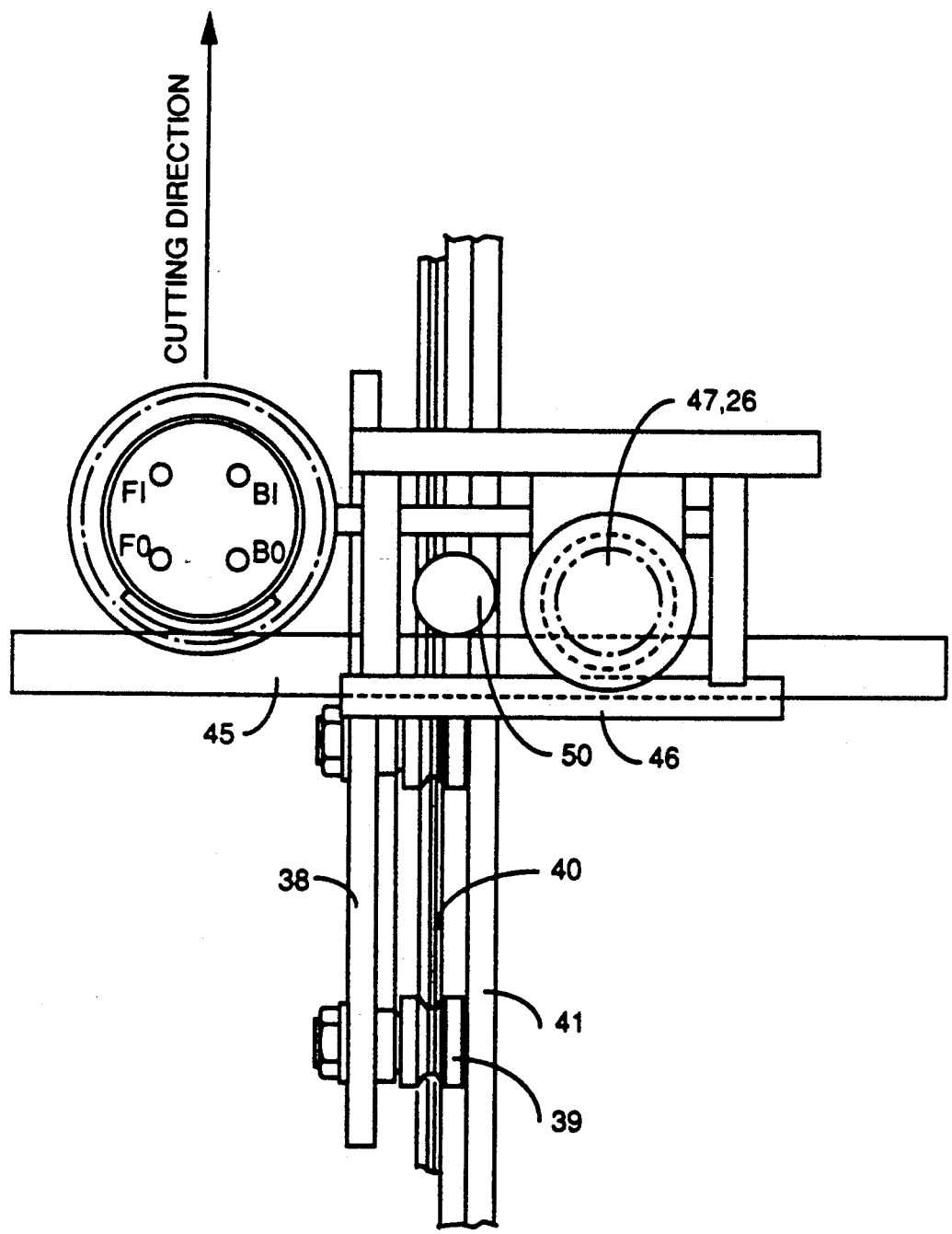

As shown in FIGS. 14a and 14b (top view) there is a more compact drive possibility as well, whereby a pushing rack 45 in a pushing rod guiding 46 can be shifted by a pinion 47 driven by motor 26 (all being installed on the adjustment plate 32) and which engages a gear wheel 49 on the burner body 29 preferably on its connection plate 15 or cover plate 18 and thus produces a rotation and shifting possibility. Of course it seems natural to complete the pushing rod guiding 46 with a support wheel 50.

By different friction factors between holding arm 30 and adjusting rollers 31 on one side and the rotation bearing of the burner on the other side, an adjustment can be made with the one or other adjustment method being privileged. For this purpose the rotation of the burner body 29 can be limited by means of mechanical stops and a friction brake 48 avoids the initiation of a linear movement before the stops are reached. By a corresponding order of shifting and pulling motions having finally exact rotations all necessary positions for the cutting nozzle 2 can be obtained.

Figure 15:
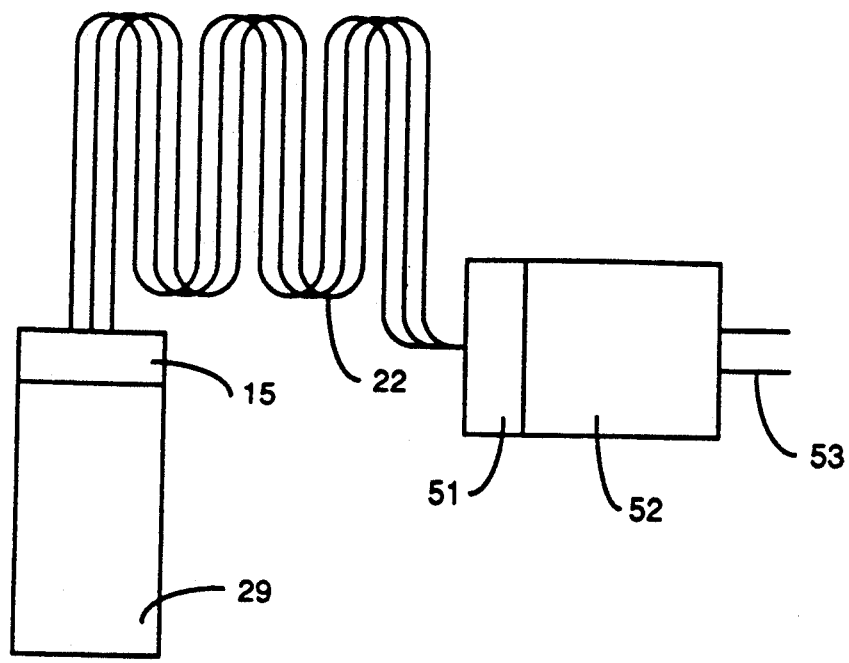
Figure 16:
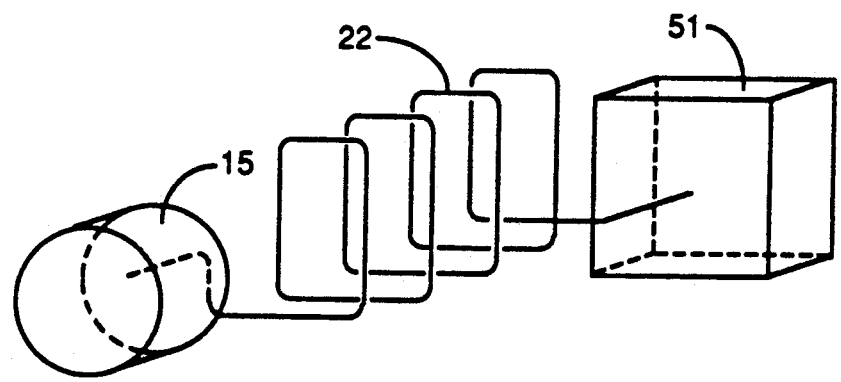

In FIG. 15 and 16 two designs of a connection are shown using supply pipes 22 between connection plate 15 of the burner and the manifold plate 15 which lead to the gas control 52 supplied by main supply pipes 53. Instead of flexible rubber or Teflon hoses all stainless steel pipes of suitable length with a suitable shape can be used for supply pipes 22, exploiting their elasticity with small forces and without lasting deformation. As the adjusting motions of the cutting nozzles 2 are for instance limited to ±75 mm and 45° corresponding to ±75 mm but not fully linearly adding a relatively short total length of pipe is sufficient. In correspondence with FIG. 15 and the supply pipes 22 are installed in bow design with up and down or forward and backward going waves or as shown in FIG. 16 with circular or square spirals to allow sufficient space for the required pipe lengths.

Figure 17:
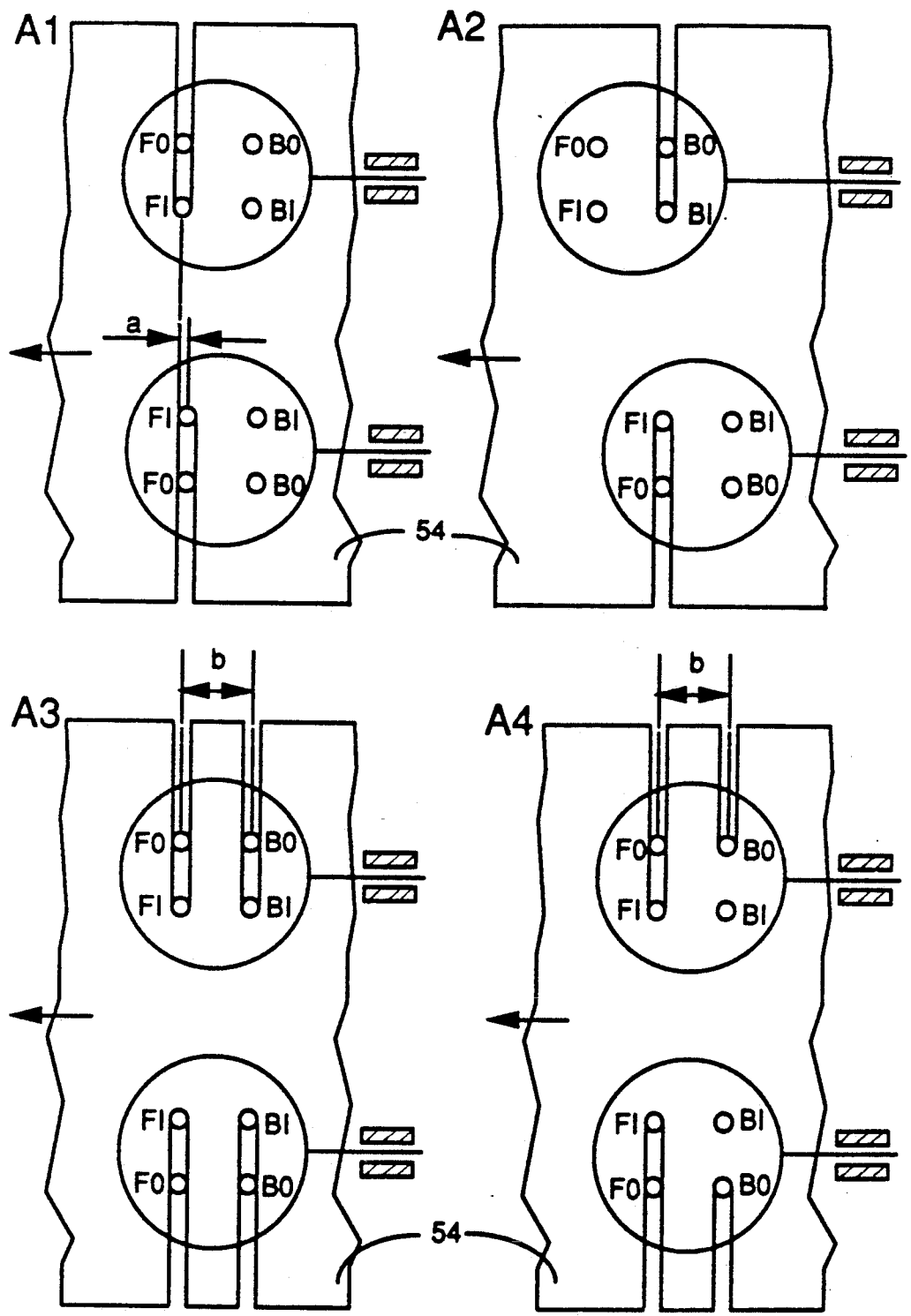

In FIG. 17 various applications of 4 eccentrically arranged cutting nozzles 2 for opposite cutting with two burners in one cut to separate one slab 54 is shown, defined by the aforementioned position definitions FO, BO, FI, BI. Once like in sketch A1 the front cutting nozzles 2 in the FI positions are used or otherwise like in sketch A2 after a shifting motion the cutting nozzles 2 in B1 positions, as exchanged without increase of cutting time. The use of the outside cutting nozzle 2 results in the increase of the rest to be cut by one cutting nozzle only before the slab 54 is fully separated. As per sketch A3 the inside cutting nozzles 'FI' and 'BI' can be used for separating cuts and for sample cutting as per A4 a corresponding front and inside arranged pair (FI/FI) and for sample cutting and pair arranged in the back and outside (BO/BO) so that the sample falls off later maybe in a predetermined position after the slab 54 is separated. Other combinations are possible.

Figure 18:
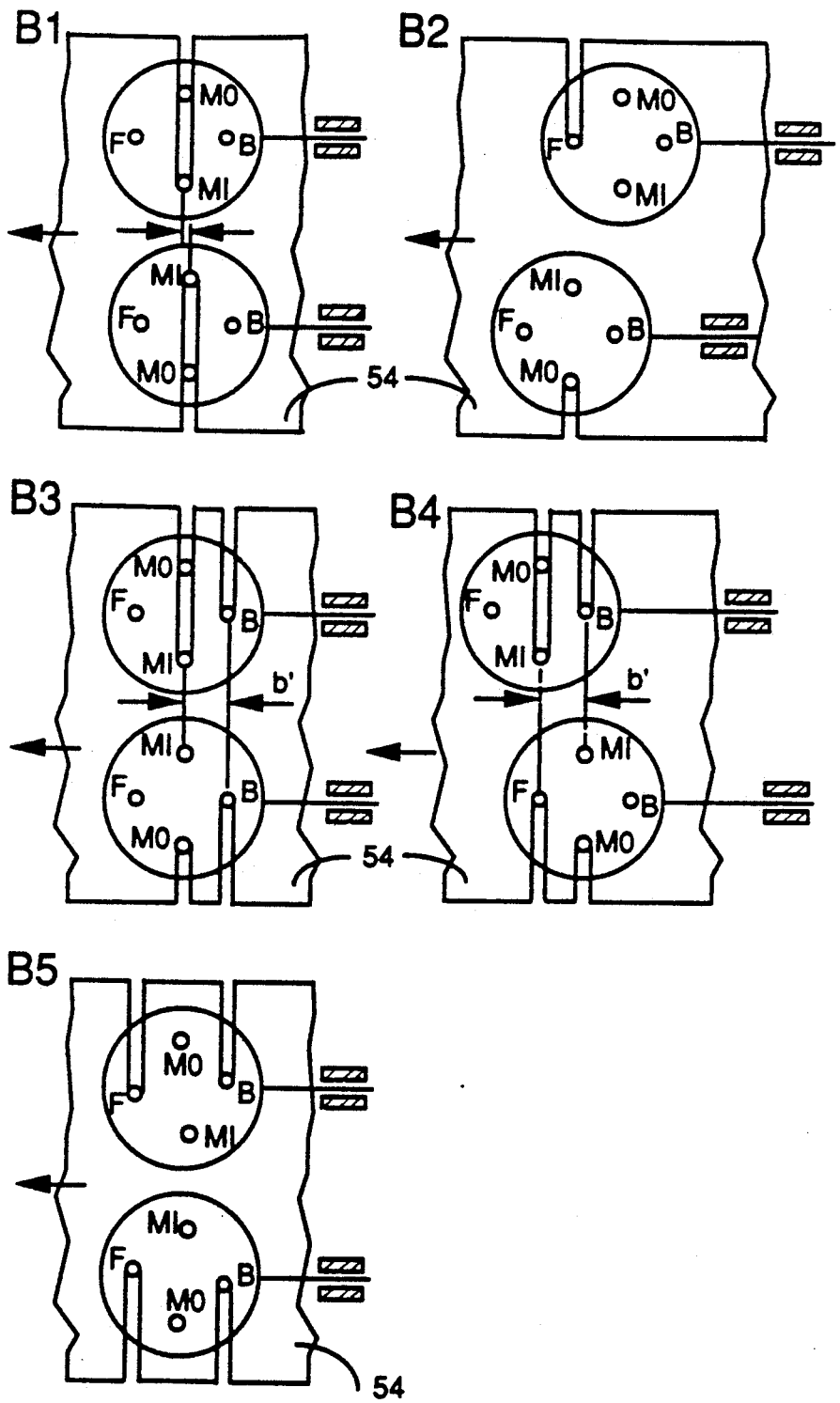

FIG. 18 gives the various positions from B1 to B5 with diamond arranged burners with 4 nozzles, especially for opposite cutting without and with sample cutting of slab 54, now more easy to understand. Hereby B1 shows the necessary adjustment 'A' of burners not cutting in line.

Figure 19:
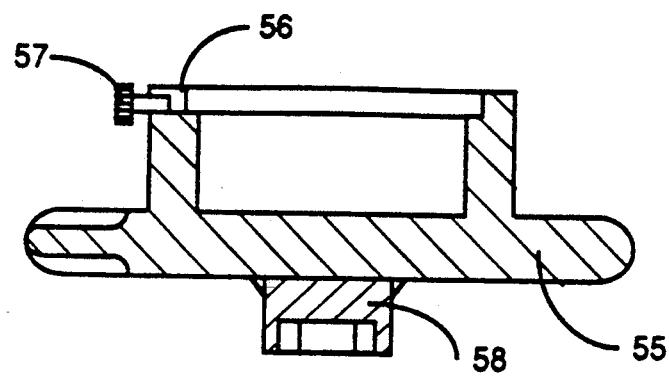
Figure 19:
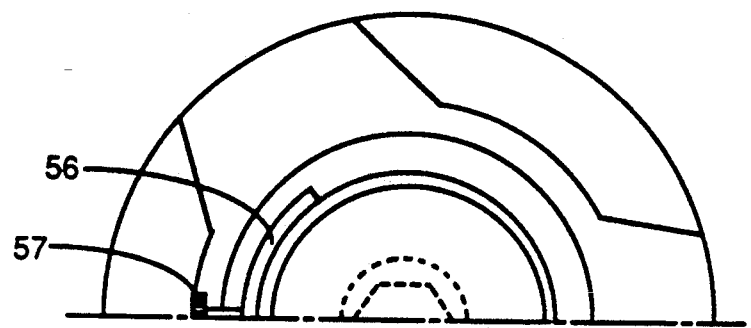

As in practice many damages to burners and nozzles occur by using standard spanners often with increased effects by using hammers as well and without counter rotating resp. holding spanners on the burner, for an intented manual burner rotation to adjust or to exchange excentric arranged and well screwed in nozzles a special tool should be used as per the claimed invention. Otherwise the efficiency of the new burner design is limited in respect to exchange or rotating=adjusting speed as well as safety. For this reason a cup spanner 55 is shown in FIG. 19, which is stuck onto the nozzle side of the burner and clamped on to it by means of clamping piece 56 and clamp screw 57. Now the burner can be rotated easily and evenly.

The cup spanner 55 has a welded on nozzle spanner 58 with an inside hexagon and allows a double handed even rotation to screw out and in nozzles, fitting into the gap of a protection plate 12 because of outer diameter and length of the nozzle spanner 58.

Flying slag particles from oxy-cutting do not only soil adjacent areas of the working cutting nozzle 2, but it sticks as well to the cutting nozzle 2 in between the jets of the cutting oxygen and the heating flames, although in smaller amounts. Thus this is blocked, as slag particles stick more easily to already sticking slag as to the well heat conducting copper of the cutting nozzle 2. Therefore this has to be cleaned often and in regular intervals by brushing, scratching or filing. Because of generally difficult accessibility during continuous operation this is performed but rarely, the life of the cutting nozzle 2 is shortened very much.

As per invention the cutting nozzle 2 is protected against splashing slag by a protection plate 12 on a shaft 11, which penetrates the nozzle head 1 except the working cutting nozzle 2. To bring other cutting nozzles 2 into working position and to protect others, the protection plate 12 or the nozzle head can be rotated or shifted against each other. This possibility to rotate or to shift can as well be used for a filing, scratching or brushing cleaning of the cutting nozzle 2, if the protection plate carries a suitable file or scratcher and these tools have inclines or similar to avoid hooking on, can be or are pressed on slightly and the rotating or shifting motion can be remotely actuated. This is no additional cost, as already prepared for the exchange of the operating cutting nozzle 2 and the protection of the other cutting nozzles 2 by the protection plate 12.

We claim:

1. A long life and multipurpose high performance burner for thermo-chemical separation of work pieces, comprising:
   a frame;
   a nozzle head rotatably mounted on said frame about an axis of rotation;
   at least one cutting nozzle mounted on said nozzle head in a position eccentric to said axis of rotation and mounted to rotate with said nozzle head in a plane generally perpendicular to said axis of rotation; 'supply means connected to each said cutting nozzle to supply heating and cutting agents to said cutting nozzle; and
   burner rotating means for rotating said nozzle head about said axis of rotation.

2. The burner of claim 1, wherein:
   said nozzle head is further mounted on said frame to move in a direction generally perpendicular to said axis of rotation,.

3. The burner of claim 1, wherein:
   said nozzle head includes a cooling channel for circulating coolant within said nozzle head, and coolant supply means connected to said channel for supplying coolant thereto.

4. The burner of claim 1, wherein:
   two cutting nozzles are mounted on said nozzle head, said cutting nozzles being angularly spaced about 180° from one another with respect to said axis of rotation.

5. The burner of claim 1, wherein:
   three cutting nozzles are mounted on said nozzle head, said cutting nozzles being angularly spaced at about 120° from one another with respect to said axis of rotation.

6. The burner of claim 1, wherein:
four cutting nozzles are mounted on said nozzle head, said cutting nozzles being angularly spaced at about 90° from one another with respect to said axis of rotation.

7. The burner of claim 6, wherein:
said burner head is rotatably mounted on said frame on a generally hollow axle, said axle being connected to pilot flame supply means for supplying heating gas and oxygen thereto to provide a pilot flame.

8. The burner of claim 7, wherein:
said axle includes a protection plate secured thereto and positioned between non-operating nozzles and the work piece.

9. The burner of claim 1, wherein:
a generally flat securing washer made of heat resistant, pressure sensitive material is positioned between each said nozzle and said nozzle head to indicate difficulties of the nozzle connection.

10. The burner of claim 1, wherein:
said rotation means includes at least one radially outward extending flange on said nozzle head, and a bearing on said frame positioned to support said flange to permit rotation of said nozzle head.

11. The burner of claim 1, wherein:
said rotation means includes a nozzle head drive having a push rod connected to said nozzle head and positioned to rotate said nozzle head.

12. The burner of claim 1, wherein:
said supply means includes a stainless steel pipe for each said heating and cutting agent connected to each said nozzle, whereby each said nozzle may be individually operated.

13. The burner of claim 1, wherein:
said rotation means includes a plurality of symmetrically spaced pin spanner bores in said nozzle head positioned to engage a spanner tool to effect rotation of said nozzle head.

14. The burner of claim 8, wherein:
said protection plate includes a tool thereon positioned to contact the non-operating cutting nozzles to clean said cutting nozzles.

* * * * *